United States Patent [19]
Reits

[11] Patent Number: 5,023,618
[45] Date of Patent: Jun. 11, 1991

[54] FM-CW RADAR APPARATUS

[75] Inventor: Bernard J. Reits, Hengelo, Netherlands

[73] Assignee: Hollandse Signaalapparaten B.V., Hengelo, Netherlands

[21] Appl. No.: 597,613

[22] Filed: Oct. 11, 1990

[30] Foreign Application Priority Data

Oct. 24, 1989 [NL] Netherlands ............. 8902628

[51] Int. Cl.$^5$ ............................................. G01S 13/26
[52] U.S. Cl. ..................................... 342/128; 342/196
[58] Field of Search ................... 342/122, 128, 196

[56] References Cited
U.S. PATENT DOCUMENTS

| | | | |
|---|---|---|---|
| 4,568,938 | 2/1986 | Ubriaco | 342/122 |
| 4,766,436 | 8/1988 | Crepin et al. | 342/122 |
| 4,947,354 | 8/1990 | Hethuin | 342/122 X |

Primary Examiner—Mark Hellner
Attorney, Agent, or Firm—Robert J. Kraus

[57] ABSTRACT

An FM-CW radar apparatus is provided with: a transmitter unit (1, 2, 3) for the emission of frequency-modulated continuous carrier waves of bandwidth B; a receiver unit (6, 7) for the reception of echo signals reflected by a target, producing target-representing beat signals; a signal processing unit, to which the beat signals are applied, provided with: an A/D converter unit (8) for the sampling and digitization of the beat signals; a first FET processing unit (10) with the object of obtaining at least range information about a target; a second FET processing unit (12) with the object of obtaining at least high resolution information about a target; a control unit (13), which makes the output signals, generated by the first FET processing unit (10) and the second FET processing unit (12), suitable for presentation on a display (14).

4 Claims, 4 Drawing Sheets

FM-CW RADAR APPARATUS

BACKGROUND OF THE INVENTION

This invention relates to an FM-CW radar apparatus provided with:
- a transmitter unit for the emission of frequency-modulated continuous carrier waves of bandwidth B;
- a receiver unit for the reception of echo signals reflected by a target, which originate from the carrier waves emitted by the transmitter unit, and for the generation of target-representing beat signals;
- a signal processing unit, to which the beat signals are applied, and which is equipped with:
   - an A/D conversion unit for the sampling and digitisation of the beat signals;
   - a first DFT processing unit, to which the sampled and digitised beat signals are applied with the object of obtaining at least range information about the target;
- a control unit, which makes the output signals, generated by the first DFT processing unit, suitable for presentation on a display.

The advantage of such a radar apparatus is that the emitted carrier waves are difficult to detect. This is due to the electromagnetic energy to be emitted being given off spread in time and distributed over a large bandwidth. In consequence of the spread in time the power is low, and in consequence of the relatively large bandwidth B the energy per frequency unit $\Delta f$ is small.

Radar apparatuses of the pulsed type exhibit the exact opposite: due to the emission of pulses, the electromagnetic energy is given off compressed in time. This implies that the power is high.

For civilian applications, an FM-CW radar apparatus has the advantage, with respect to a pulse radar apparatus, that the modulated carrier waves cause little interference to other equipment, such as communication equipment.

For military applications an additional advantage is that, for an adversary, it is virtually impossible to detect the modulated carrier waves of an FM-CW radar apparatus. This is because the energy per frequency unit $\Delta f$ is so small that it is lost in noise.

It is known that the range resolution $\Delta R$ of an FM-CW radar apparatus is substantially equal to C/2B, C representing the speed of light and B the bandwidth. If an N-point DFT processing unit is employed, the maximum detectable range $R_{max} = CN/4B$.

For quite some time the need has been felt for an FM-CW radar apparatus of longer range. It is known that doubling the maximum range ($2R_{max}$) can be achieved by halving the bandwidth B. It is also known that the maximum range of an FM-CW radar apparatus can be adjusted to $R'_{max} = k \cdot R_{max}$ ($k \geq 1$; $k \in R$) by making the bandwidth equal to B/k. Thus, existing equipment (with the same N-point DFT processing unit) enables detection of a target at a larger range.

However, since the bandwidth is reduced by a factor k, the detectability of the FM-CW radar apparatus is increased by the same factor. This implies that the advantage of an FM-CW radar apparatus, viz. the virtual undetectability of the emitted carrier waves, is lost. An additional disadvantage is that the range resolution decreases with a factor of k.

The invention fully solves both problems, yielding an FM-CW radar apparatus of increased range, without deterioration of the detectability and the range resolution.

SUMMARY OF THE INVENTION

To achieve this, the radar apparatus features the following:
- a modulation sweep of the frequency-modulated carrier waves occupies a time of k.T seconds ($k > 1$, $k \in R$);
- a DFT sample period of the first DFT processing unit occupies a time of T seconds, so that a modulation sweep comprises more than one DFT sample period;
- the FM-CW radar apparatus is provided with a second DFT processing unit, to which is applied at least part of the first DFT processing unit's output signals, associated with one modulation sweep, and an output signal of which, containing target range information of a higher resolution than that generated by the first DFT processing unit, is applied to the control unit.

An additional advantage is an improved detection of remote targets, because the beat signals are present during practically the complete sample period.

It is remarkable that the output signals of the second DFT processing unit contain high-resolution range information of a range quant of the first DFT processing unit.

BRIEF DESCRIPTION OF THE DRAWINGS

The invention will be explained in detail with reference to the accompanying drawings, of which.

DESCRIPTION OF THE PREFERRED EMBODIMENTS

Figure 1:
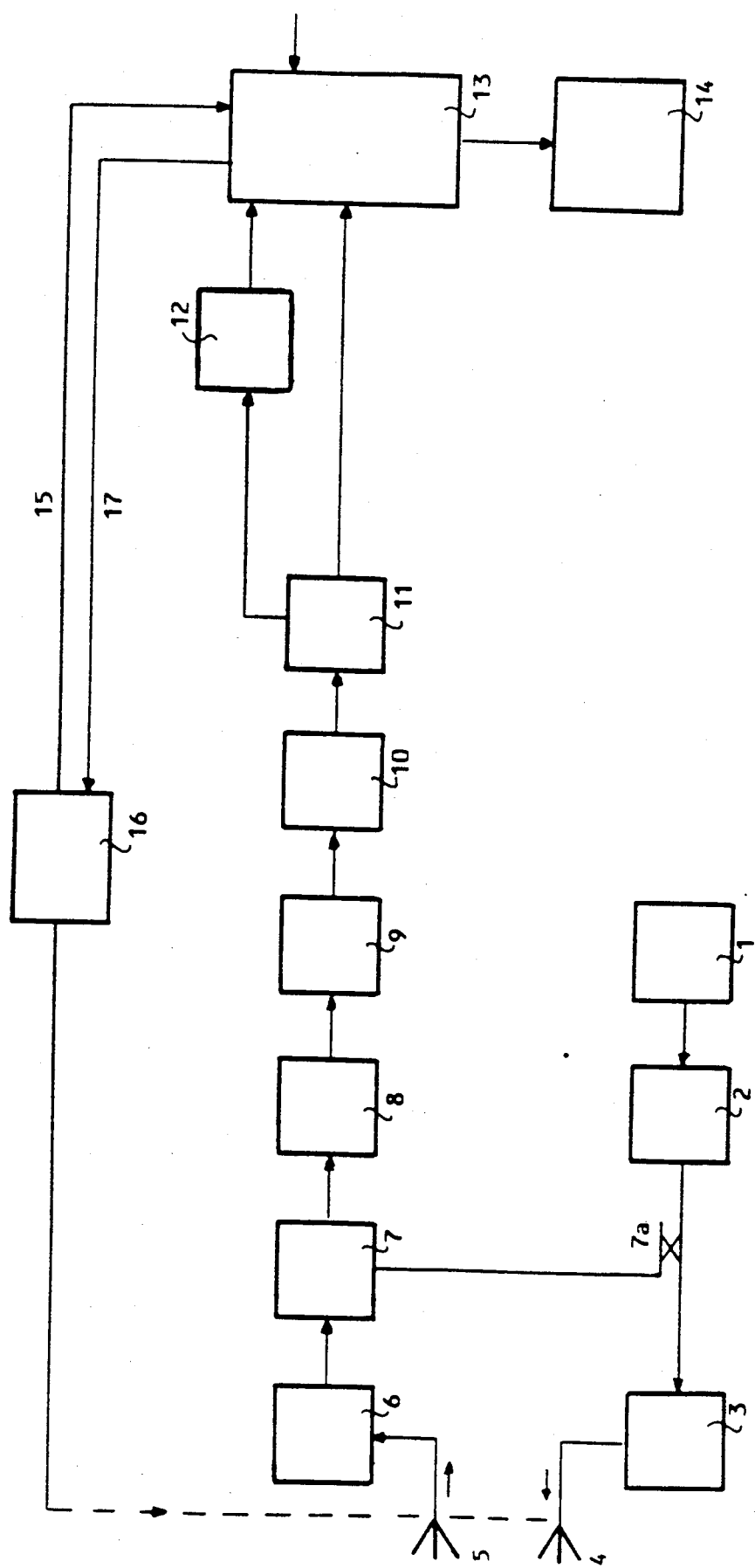
FIG. 1 represents a typical FM-CW radar apparatus.

In FIG. 1 a typical FM-CW radar is shown. The radar applies FM-CW techniques to determine the range of a target. It can therefore be equipped with a transmitter (1, 2, 3) of very low output power.

Using a sweep generator 1, an oscillator 2 and an amplifier 3, a CW signal, which is frequency-modulated, is emitted by way of a transmitting antenna 4. The echo signal collected by a receiving antenna 5 is applied to a receiver (6, 7) comprising a low-noise amplifier 6 and a mixer 7. By means of a power splitter 7a, part of the transmit signal is likewise applied to the mixer 7. Mixing of the transmit signal and the received echo signal yields a beat signal of beat frequency $f_b$, which is the difference between the frequencies of the transmit signal and the received echo signal. The beat frequency $f_b$ is directly proportional to the range of the object which has (partially) reflected the emitted signal, see FIG. 2A. Consequently, by measuring the beat frequency, the range of the object can be determined. To this end the beat signal is applied to an A/D converter 8, which operates at a sample frequency $f_s$. The output signal of the A/D converter 8 is applied to an input memory 9. The input memory contains each time N digitised and sampled beat signals originating from a sweep (see FIG. 2A).

The N digitised samples of the beat signal stored in the memory 9 are applied to a DFT processing unit 10, which determines the frequency of the beat signal and hence the target range. The result of the calculation is stored in an intermediate memory 11. The range information stored in the intermediate memory 11 is applied to a control unit 13. In view of the present state of technology, said DFT processing unit will usually be arranged as an FFT processing unit.

The control unit 13 generates a drive signal for a viewing screen, which in this case is of the LCD type. To enable the control unit 13 to determine the position on the screen 14 where a target is to be shown, an additional signal indicating the position of the transmit and receive antennas 4, 5 is furnished to it via line 15. To this and, the transmit and receive antennas 4, 5 are connected to a servo unit 16 which rotates the transmit and receive antennas and determines their azimuthal and/or elevation position.

Figure 2:
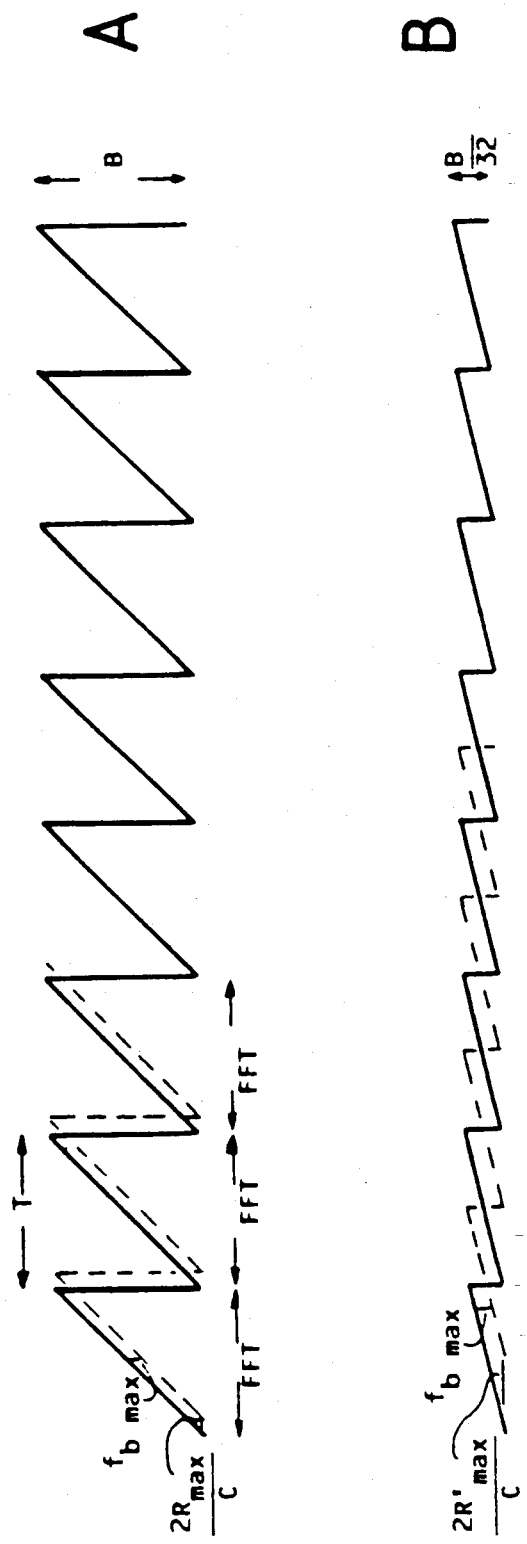
FIGS. 2A,B shows some known carrier wave patterns, of different ranges, which can be used with the radar apparatus of FIG. 1.

In FIG. 2A a typical pattern is shown of a frequency-modulated carrier wave, which is determined by the sweep generator 1. The bandwidth is designated B, and the length of time of the sweep T. The dotted curve represents the echo signal of a target. The difference between the frequencies of the transmitted signal and the reflected signal, the beat frequency, is designated $f_b$ and is a measure for the target range. The following equation applies:

$$f_b = \frac{B}{T} \cdot \frac{2R}{C} \tag{1}$$

where R is the target range and C the speed of light.
From formula (1) it follows that $$R = \frac{f_b \cdot C \cdot T}{2B} \tag{2}$$

The sample frequency $f_s$ of the FFT unit 10 determines the maximum detectable beat frequency according to $$f_{b\ max} = \frac{f_s}{2} \tag{3}$$

Combination of formulas (2) and (3) and produces the following formula for the maximum detectable range $R_{max}$:

$$R_{max} = \frac{C}{4B} \cdot f_s \cdot T \tag{4}$$

On the other hand the sample frequency $f_s$ is chosen such that a received echo signal of a modulation sweep is utilised to the maximum extent for the generation of target information, optimising the signal-to-noise ratio. This implies that $$f_s = N \cdot 1/T; \tag{5}$$

in other words, an FFT calculation is performed using a maximum of N sampled and digitised numbers which have been obtained during T consecutive seconds. Combination of formulas (4) and (5) produces $$R_{max} = \frac{CN}{4B} \tag{6}$$

If C and N are constants, formula (6) shows that the maximum range $R_{max}$ can be increased by decreasing the bandwidth B. The range resolution $\Delta R$ can easily be derived from formula (6):

$$\Delta R = \frac{C}{4B} \tag{7}$$

As an example, FIG. 2B shows a maximum detectable range which is thirty-two times the maximum detectable range $R_{max}$ of FIG. 2A. The bandwidth B has been reduced to $B' = B/32$. As the same FFT processing unit is employed, the maximum detectable beat frequency $f_{b\ max} = f_2/2$. However, now $f_{b\ max}$ corresponds with a maximum range $R'_{max} = 32 R_{max}$, see formulas (4) and (6). FIG. 2B clearly illustrates that the bandwidth B' is smaller than the bandwidth B of FIG. 2A. The scales of FIGS. 2A and 2B are adapted in order to show a clear picture. As a consequence, the transmitted microwave energy per frequency unit is thirty-two times higher. This, as explained before, increases the detectability of the radar apparatus. Moreover, there is an increased risk of interference of electromagnetically sensitive equipment in the vicinity of the radar apparatus. From formula (7) it also follows that the range resolution $\Delta R'$ has decreased to $\Delta R' = 32 \Delta R$.

Figure 3:
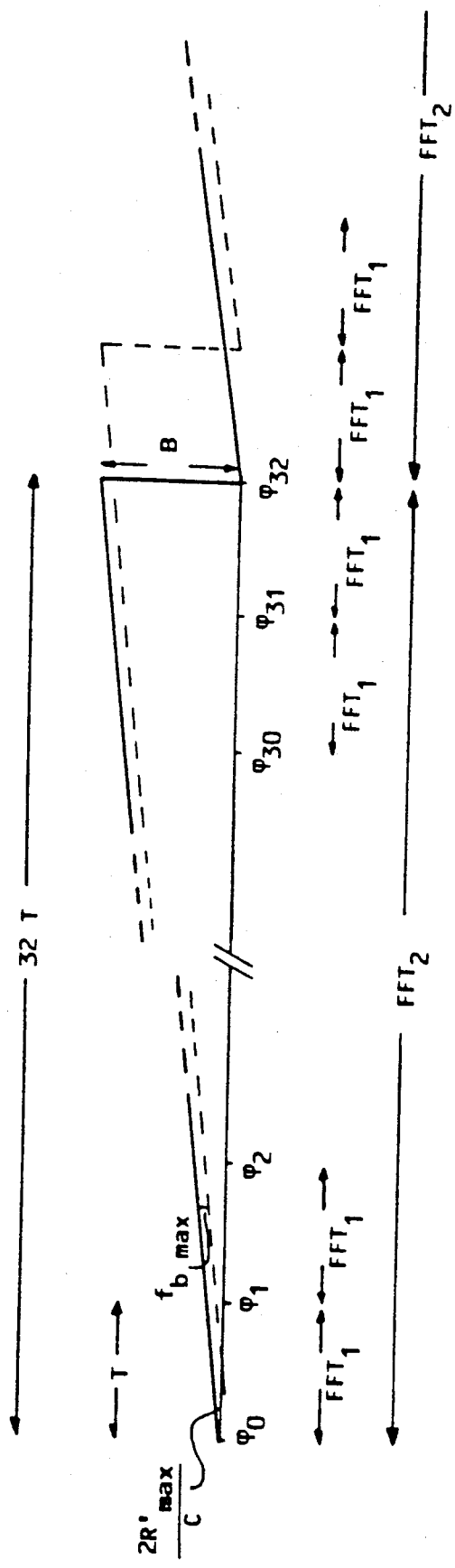
FIG. 3 shows a carrier wave pattern according to the invention.

A possible waveform according to the invention of an FM-CW radar apparatus with an increased maximum detectable target range $R'_{max}$ is shown in FIG. 3. The dotted line in the figure indicates that the maximum range corresponding to $f_{b\ max} = f_s/2$ has increased by a factor 32 relative to the maximum range associated with the modulation pattern of FIG. 2A. Because the length of time kT of a sweep has been increased (k = 32), the bandwidth B has remained the same. Consequently, the FM-CW radar apparatus operating in the mode according to FIG. 3 is not easier to detect than when operating in the mode of FIG. 2A.

As explained before, the maximum detectable range is $$R'_{max} = k \cdot R_{max} = \frac{k \cdot CN}{4B} \tag{8}$$

From formulas (6) and (8) it follows that the range resolution $\Delta R$ associated with the output signal of the FFT unit 10 has decreased by a factor k.

According to the invention the range resolution $\Delta R$ can be improved by a factor p ($p \leq k$) if a second FFT processing unit is used. This means that, if p = k is chosen, the following formula applies substantially to the new resolution $\Delta R_h$ $$\Delta R_h = \frac{1}{p} \cdot \frac{k \cdot C}{4B} = \frac{C}{4B} \tag{9}$$

From formula (9) it follows that the new resolution, henceforth referred to as super resolution, is independent of the adjusted maximum detectable range $R'_{max}$. According to the invention, the FM-CW radar apparatus is for this purpose equipped with a second DFT processing unit 12, which in this case is an M-point FFT processing unit. Because the maximum range $R'_{max}$ of the radar apparatus equals $32 R_{max}$, $1 \leq k \leq 32$ applies.

Suppose that the radar apparatus operates in a mode where $R'_{max} = 32 R_{max}$. This implies that the length of a modulation sweep is equal to 32T, see FIG. 3. The 32 output signals of the 32 consecutively executed FFT calculations are stored in the intermediate memory 11. If a target at a range R is required to be displayed with super resolution and if $R \leq R'_{max}$, then this can be achieved in a way where the radar apparatus is switched from a search mode to a mode in which the radar antenna is trained on the target. On the basis of the signals originating from the first FFT processing unit 10, the target is displayed by the control unit 13 as a point target on the screen 14. Of the $k = 32$ results of the FFT calculations of one modulation sweep stored in the intermediate memory 11, p ($p \leq k$) FFT results are applied to the M-point FFT processing unit 12. In this case, $p = M = 32$ has been chosen. The output signal of the M-point FFT processing unit 12 is applied to the control unit 13. The control unit 13 selects either the signal originating from the first FFT processing unit or the one originating from the second for display on the screen. The selection may be made by hand. The two signals can, of course, also be displayed simultaneously. If the output signal of the second FFT processing unit is selected for display, the resulting picture of the target concerned is 32 times enlarged relative to the picture originating from the first FFT processing unit 10. For the super resolution of the picture originating from the second FFT processing unit, the following applies (formula 9)

$$\Delta R_h = \frac{1}{32} \cdot \frac{32C}{4B} = \frac{C}{4B} \tag{10}$$

The above statements can be demonstrated as follows (see also FIG. 3): The sample frequency $f_s$ of the first FFT processing unit is equal to $f_s = N/T$. Since the second FFT processing unit performs an FFT operation on the consecutively obtained output signals of the first FFT processing unit, the following applies for the sample frequency $f_s^{(2)}$ of the second FFT processing unit 12:

$$f_s^{(2)} = \frac{f_s}{N} = \frac{1}{T} \tag{11}$$

At the start of each modulation sweep the phase of the transmit signal is reset to zero. Suppose that $\phi_r$ is the start phase of the beat signal of the r-th FFT sample period ($0 \leq r \leq 31$).

The following applies:

$$\phi_r = \phi_0 + 2\pi f_b r T \tag{12}$$

Here $\phi_0$ varies with the target range.

The phase differencs between two adjacent FFT sample periods $r+1$ and $r$ then is:

$$\Delta\phi = \phi_{r+1} - \phi_r = 2\pi f_b T \tag{13}$$

Suppose that the beat frequency f is equal to:

$$f_b = \left( q \cdot \frac{f_s}{2N} + \Delta f \right) \tag{14}$$

where $q \in \{0, 1, 2, \ldots, 31\}$ and $$\Delta f < \frac{f_s}{2N};$$

in other words, the beat frequency f is written as a whole number of times the halved sample frequency of the first FFT processing unit 10, plus a residual term $\Delta f$ which is smaller than half the sample frequency of the first FFT processing unit.

Actually, the term $$\frac{f_s}{2N}$$

in formula (14) is the smallest frequency difference that can be measured with the first FFT processing unit 10 and thus determines the corresponding range resolution (range quant) of the first FFT processing unit 10.

Combination of formulas (13) and (14) produces:

$$\Delta\phi = \pi \cdot q + 2\pi \Delta f \cdot \frac{N}{f_s} \tag{15}$$

The phase difference $\Delta\phi$ is built up in T seconds and corresponds with a frequency f' according to $$f' = \frac{\Delta\phi}{2\pi T} = \frac{p}{2T} + \Delta f \cdot \frac{N}{f_s T} = \frac{p}{2T} + \Delta f \tag{16}$$

The second FFT processing unit measures a frequency f' according to formula (16). Since the maximum detectable frequency of the second FFT processing unit is equal to $$\frac{f_s^{(2)}}{2} = \frac{1}{2T},$$

it follows that, of f', the second FFT processing unit measures only the frequency component $\Delta f$. For the frequency f'' measured by the second FFT processing unit, the following applies:

$$f'' = \Delta f.$$

Loosely interpreted, formula (17) means that range information is measured within a range quant of the first FFT processing unit. For the frequency $\Delta(\Delta f)$, at least to be measured by the second FFT processing unit, the following applies:

$$\Delta(\Delta f) = \frac{f_s^{(2)}}{2M} \tag{18}$$

Consequently, for the associated range resolution $\Delta R_h$ the following applies:

$$\Delta R_h = \Delta(\Delta f) \cdot \frac{C \cdot T}{2B} \cdot k = \frac{f_s}{2M}. \tag{19}$$

$$\frac{C \cdot T}{2B} \cdot k = \frac{f_s}{2.32} \cdot \frac{C \cdot T}{2B} \cdot 32 = \frac{C \cdot T \cdot f_s}{4B} = \frac{C}{4B} = \Delta R_1$$

where $\Delta R_1$ indicates the resolution for $k = 1$ (see formula (7)); i.e., the resolution of the first FFT processing unit when the radar operates at minimum range.

If a modulation sweep comprises k FFT (first) sample periods, of which the results of p FFT calculations (p≦k) are applied to the second FFT processing unit (M≧p), the following generally applies for the resolution ΔRh:

$$\Delta R_h = \frac{k}{p} \cdot \frac{C}{4B} \tag{20}$$

The invention is not limited to modulation patterns whose time span covers the length of time T of an FFT calculation a whole number of times. It is possible, for example, for the FM-CW radar apparatus according to the invention to be provided with a mode whereby the sweep of a modulation pattern takes, say, 3.4T seconds and the bandwidth of the sweep is B. It will be evident that, in processing an echo signal, at least three complete FFT calculations can be performed. It can therefore be stated that, if the length of a modulation sweep is equal to kT (k≧1; k ∈R), for the maximum detectable range $R'_{max}$, applies that $R'_{max} = k.R_{max}$, whereby $R_{max}$ is the maximum detectable range for k=1, i.e., the maximum detectable range when the length of a modulation sweep equals the length T of an FFT calculation.

The remainder of the sampled and digitised echo signal, however, is in this case also applied to the first FFT processing unit, e.g. n points (n<N). For the other N-n points, zeroes are applied to the first FFT processing unit in the usual way. This can simply be realised by resetting the input memory 9 to zero before new information is applied. When the memory is filled for a newly executed FFT calculation, the non-used memory locations will contain a zero.

It is also possible to read the input memory 9 in such a way that the periods T slightly overlap, which means that the results of a 3.4T seconds modulation pattern can deliver an input for four FFT calculations with length T. We have than a 20% overlap.

Figure 4:
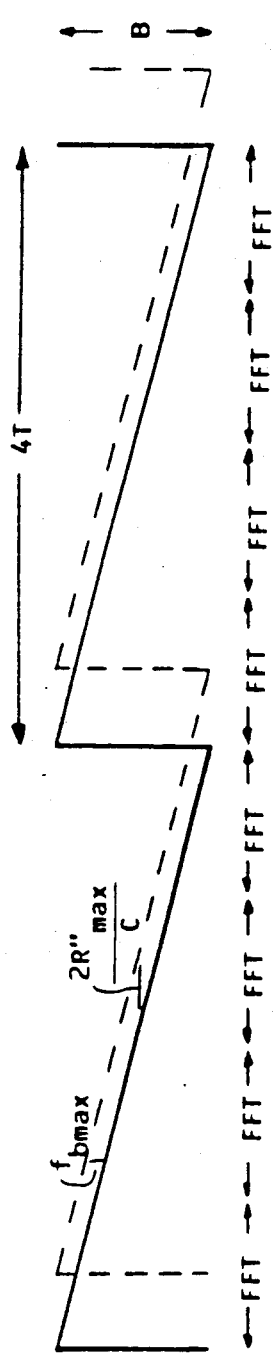
FIG. 4 shows another carrier wave pattern according to the invention.

The invention is not limited either to a specific form of the modulation pattern. For example, FIG. 4 shows an alternative form which yields, however, in a manner which is entirely analogous to what has been described before, the same beat frequency, which is a measure for the target range. For the wave pattern of FIG. 4, k=p=M=4 has been chosen.

Figure 5:
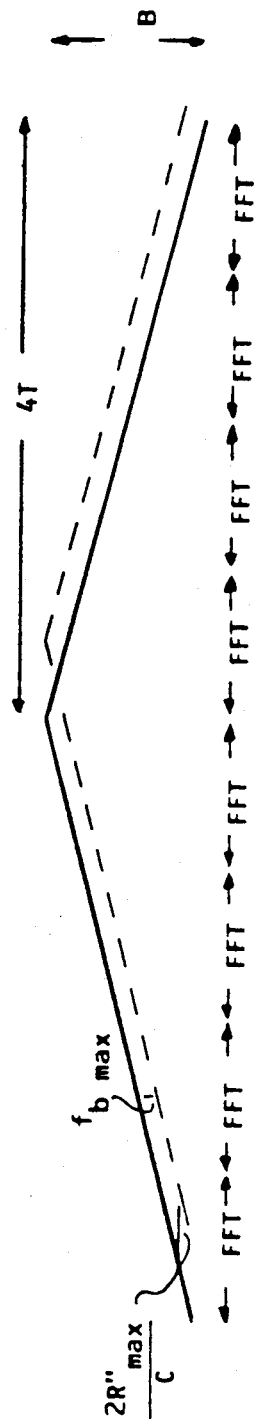
FIG. 5 shows a third carrier wave pattern according to the invention.

In FIG. 5 a different version of a usable modulation pattern is shown. For clarity, the maximum detectable beat frequency $f_b=f_s/2$ is given with the corresponding ranges $R_{max}$ and $R'_{max}$. In this case, too, k=p=M=4 has been chosen.

As indicated before, the invention is not limited to the embodiment where p=k, but generally comprises p≦k. It is possible, for instance, to choose k=32 and p=16. Then, p=16 results of FFT calculations, successively obtained by the first FFT processing unit and comprised within one modulation sweep, are applied to the intermediate memory 11. The p=16 FFT results are subsequently applied to the 32-point second FFT processing unit. Additionally, 16 zeroes are applied to the second FFT processing unit. As described for memory 9, this can be realised by resetting the intermediate memory 11 to zero before the 16 FFT results are read.

Usually, p=k will be chosen, to enable all available information to be utilised. M will preferably be chosen so that M=p; hence, in this case, p=k=M=32 has been chosen.

Finally it should be noted that the above-described FM-CW radar apparatus can be used in a track radar as well as a search radar. In case of a track radar, the servo unit 16 is driven via line 17 in the usual way by the control unit 17, to ensure that antennas 4, 5 remain pointed at the target.

I claim:
1. FM-CW radar apparatus provided with:
   a transmitter unit for the emission of frequency-modulated continuous carrier waves of bandwidth B;
   a receiver unit for the reception of echo signals reflected by a target, which originate from the carrier waves emitted by the transmitter unit, and for the generation of target-representing beat signals;
   a signal processing unit, to which the beat signals are applied, and which is equipped with:
      an A/D conversion unit for the sampling and digitisation of the beat signals;
      a first DFT processing unit, to which the sampled and digitised beat signals are applied with the object of obtaining at least range information about the target;
   a control unit, which makes the output signals, generated by the first DFT processing unit, suitable for presentation on a display,
   characterised in that
      a modulation sweep of the frequency-modulated carrier waves occupies a time of k.T seconds (k>1, k ∈R);
      a DFT sample period of the first processing unit occupies a length of time of T seconds, so that a modulation sweep covers more than one DFT sample period;
      the FM-CW radar apparatus is provided with a second DFT processing unit, to which is applied at least part of the first DFT processing unit's output signals, associated with one modulation sweep, and an output signal of which, containing target range information of a higher resolution than that generated by the first DFT processing unit, is applied to the control unit.

2. FM-CW radar apparatus according to claim 1, characterised in that
   the first DFT processing unit is provided with an N-point FFT processing unit, which processes N input signals, sampled and digitised with a sample frequency $f_s$, whereby substantially $$R_{max} = \frac{CN}{4B},$$

C represents the speed of light and $$f_s = N \cdot \frac{1}{T};$$

the second DFT processing unit is provided with an M-point FFT processing unit, where p output signals of the first FFT processing unit, successively obtained and associated with a modulation sweep of k.T seconds, are applied to the M-point FFT processing unit with p≦k, p≦M, p ∈N, and where for the high resolution $\Delta R_h$ substantially holds:

$$\Delta R_h = \frac{C \cdot k}{4Bp}.$$

3. FM-CW radar apparatus according to claim 2, characterised in that p=k.

4. FM-CW radar apparatus according to claim 3, cheracterised in that p=k=M.

* * * * *